US012787933B2

(12) United States Patent
Holtkötter et al.

(10) Patent No.: US 12,787,933 B2
(45) Date of Patent: Nov. 10, 2026

(54) FORAGE HARVESTER WITH DISCHARGE CHUTE

(71) Applicant: CLAAS Saulgau GmbH, Bad Saulgau (DE)

(72) Inventors: Niklas Holtkötter, Unna (DE); Kai Penner, Bielefeld (DE); Niklas Löffler, Hohentengen (DE); Tobias Deufel, Meßkirch-Menningen (DE); Benjamin Bauknecht, Ostrach (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 357 days.

(21) Appl. No.: 18/411,333

(22) Filed: Jan. 12, 2024

(65) Prior Publication Data

US 2024/0237580 A1 Jul. 18, 2024

(30) Foreign Application Priority Data

Jan. 12, 2023 (DE) ..................... 10 2023 100 635.5
Jan. 12, 2023 (DE) ..................... 10 2023 100 636.3

(51) Int. Cl.
*A01D 43/08* (2006.01)

(52) U.S. Cl.
CPC ........... *A01D 43/087* (2013.01); *A01D 43/08* (2013.01)

(58) Field of Classification Search
CPC .... A01D 43/087; A01D 43/086; A01D 43/00; A01D 43/08; A01D 43/063; A01D 43/0631; A01D 43/07; A01D 41/1217; B62D 53/00; A01F 12/46; A01F 29/00
USPC ........... 460/114; 56/13.3; 198/518; 414/523; 193/16, 17, 6; 280/278, 6.15; 298/7; 366/68; 701/50
See application file for complete search history.

(56) References Cited

U.S. PATENT DOCUMENTS 785,241 A * 3/1905 Ulrich .................... B65G 21/14 198/632
2,720,424 A * 10/1955 Hansen ................... A01F 29/01 406/99

(Continued)

FOREIGN PATENT DOCUMENTS

DE 102017220148 A1 5/2019
EP 0274761 B1 3/1991

(Continued)

OTHER PUBLICATIONS

European Search Report for EP Application No. 23213419.7-1105 mailed on May 24, 2024.

*Primary Examiner* — Christopher J Sebesta
*Assistant Examiner* — Sunny D Webb
(74) *Attorney, Agent, or Firm* — Lempia Summerfield Katz LLC

(57) ABSTRACT

A forage harvester with a discharge chute. The discharge chute comprises a chute connecting piece arranged on the forage harvester so as to be pivotable about a first axis and a first chute extension arranged on the chute connecting piece. The first chute extension comprises a first section and a second section arranged on the first section so as to be pivotable about a second axis. In an unfolded position, the second section forms a longitudinal extension of the first section. A contact surface of the first and second sections lies in a plane, with the second axis being inclined at an angle relative to the plane.

20 Claims, 7 Drawing Sheets

(56) References Cited

U.S. PATENT DOCUMENTS 2,772,767 A * 12/1956 Seifert ..................... B60P 1/40
198/666
3,456,769 A * 7/1969 Prichard .............. B28C 5/4251
193/4
3,521,767 A * 7/1970 Rossi .................... B28C 5/4255
198/593
3,822,534 A * 7/1974 Martin .................. A01D 67/00
56/15.8
3,923,175 A * 12/1975 Landvatter ............... B60P 1/36
193/4
4,427,105 A * 1/1984 Hawley ............... B65G 41/002
198/666
5,108,249 A * 4/1992 Kinzenbaw .............. B60P 1/38
414/528
5,953,892 A * 9/1999 Albicker ............. A01D 43/086
56/71
6,994,623 B2 * 2/2006 Isfort .................. A01D 43/087
460/114
7,815,499 B2 * 10/2010 Haffert ................ A01D 43/087
56/13.3
8,438,821 B2 * 5/2013 Haffert ................ A01D 43/087
56/13.3
8,882,124 B2 * 11/2014 Yap ..................... B62K 15/006
280/278
2019/0289787 A1 9/2019 Heitmann et al.
2022/0061216 A1 3/2022 Heitmann et al.
2022/0071091 A1 3/2022 Heitmann et al.
2023/0232740 A1 7/2023 Heitmann et al.

FOREIGN PATENT DOCUMENTS

EP 1219159 A1 * 7/2002 .......... A01D 43/073
EP 2952084 A1 * 12/2015 .......... A01D 43/087
EP 2959766 A1 * 12/2015 .......... A01D 43/087
EP 2952084 B1 2/2019
EP 4656029 A1 * 12/2025 .......... A01D 43/086

* cited by examiner

FORAGE HARVESTER WITH DISCHARGE CHUTE

CROSS REFERENCE TO RELATED APPLICATIONS

This application claims priority under 35 U.S.C. § 119 to German Patent Application No. DE 10 2023 100 635.5 filed Jan. 12, 2023 and to German Patent Application No. DE 10 2023 100 636.3 filed Jan. 12, 2023, the entire disclosure of both of which are hereby incorporated by reference herein.

TECHNICAL FIELD

The present invention relates to a forage harvester with a discharge chute and a method for folding a discharge chute.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

EP 2 952 084 B1 discloses a forage harvester with a folding discharge chute. The self-propelled harvester, which may be designed as a forage harvester, comprises a discharge chute which may be mounted on the forage harvester so as to be rotatable about a vertical axis of rotation, and with a chute extension which may be mounted on a longitudinal end of the discharge chute facing away from the harvester so as to be pivotable about a pivot axis, so that the chute extension is pivotable by 180 degrees between an unfolded position in which the chute extension extends as a longitudinal extension of the discharge chute, and a folded position in which the chute extension is arranged or positioned alongside (e.g., along or by the side of; side-by-side with) the discharge chute. To drive a pivoting movement of the chute extension from one position to the other position, the harvester has a piston-cylinder unit designed as a hydraulic cylinder. In addition to the vertically extending axis of rotation, the discharge chute is arranged or positioned to pivot about a pivot axis extending transversely to the axis of rotation so that the height of the discharge end of the chute and that of the chute extension mounted on the discharge end may be adjusted.

The discharge chute may be moved into a storage position when driving on the road or when changing from one crop to another. In the storage position, the chute extension may be in the folded position and may be placed on a storage rack at the rear of the forage harvester. For the harvesting process, the discharge chute may then be moved to a height provided for the harvesting process, and the chute extension may then be transferred to the unfolded position.

BRIEF DESCRIPTION OF THE DRAWINGS

The present application is further described in the detailed description which follows, in reference to the noted drawings by way of non-limiting examples of exemplary embodiment, in which like reference numerals represent similar parts throughout the several views of the drawings, and wherein.

DETAILED DESCRIPTION

Figure 1:
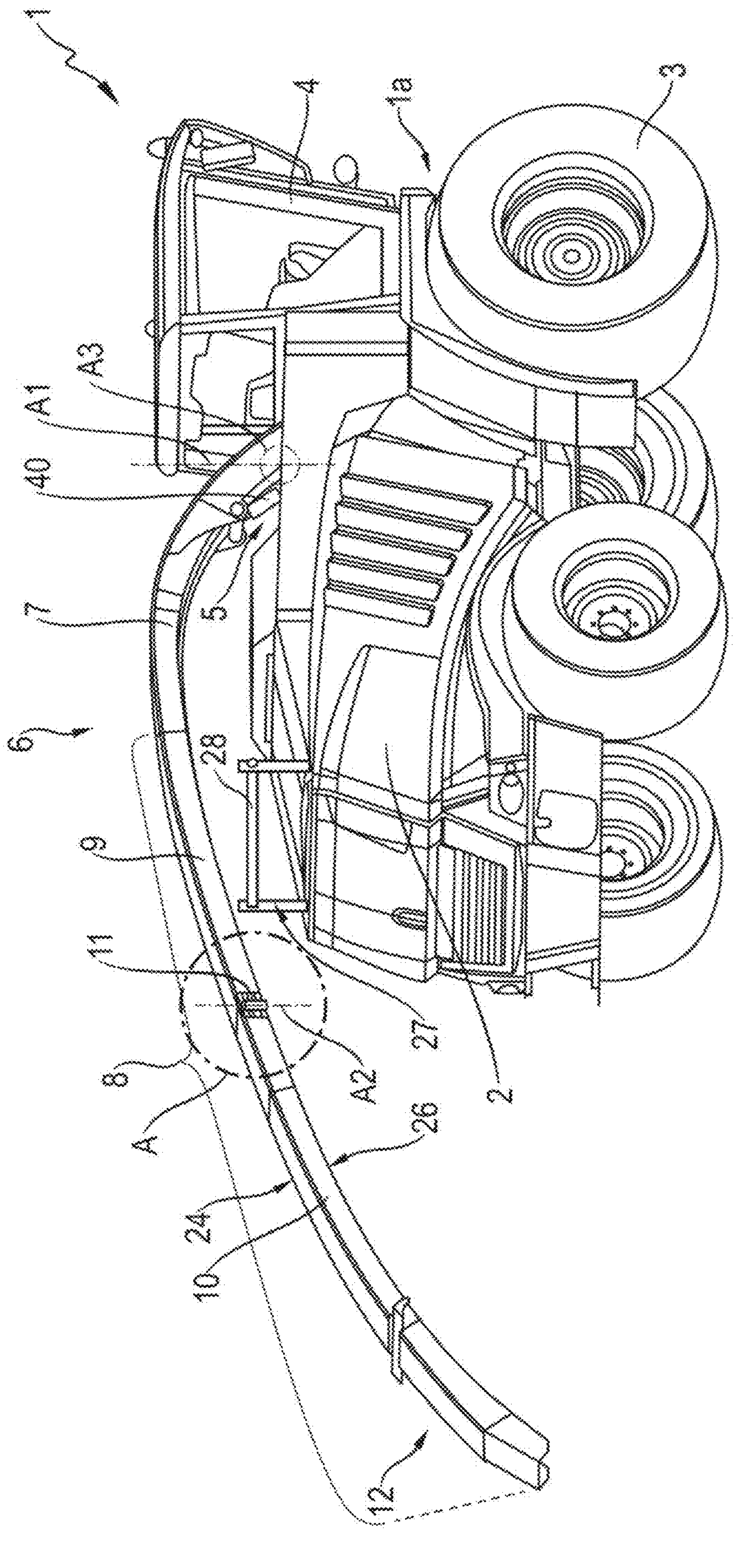
FIG. 1 illustrates a schematic side view of a forage harvester with a discharge chute, wherein a chute extension in a first position.

As discussed in the background, a forage harvester may use a discharge chute. As a result of ever-increasing cutting unit lengths, increasingly longer discharge chutes may be required for loss-free lateral transfer of the harvested material chopped by the forage harvester onto a transport wagon, such as a loader wagon. This may be achieved by using longer chute extensions. A disadvantage of this may be that the chute extension protrudes higher upwards in the storage position, which may impair the driving behavior for an operator of the forage harvester or which may exceed the maximum permissible height for road traffic.

Furthermore, because of the longer chute extensions, there may be a disadvantage that the articulated joints, which may form the axis for pivoting the chute extension from the unfolded position to the folded position and vice versa, are exposed to significantly greater forces may therefore wear out more quickly.

As such, in one or some embodiments, a discharge chute is disclosed with a chute extension which, despite the long longitudinal extension of the chute extension in the folded state, does not exceed the height permitted for road traffic. Further, in one or some embodiments, a method is disclosed for folding a discharge chute which may enable automated and low-wear (or lower-wear) pivoting of the chute extension.

In one or some embodiments, a forage harvester is disclosed with a discharge chute. The discharge chute comprises a chute connecting piece arranged or positioned on the forage harvester so as to be pivotable about a first axis and at least one (such as a first chute) extension arranged or positioned on the chute connecting piece. The first chute extension may comprise a first section and a second section, with the second section arranged or positioned on the first section so as to be pivotable about a second axis. In an unfolded position, the second section may form a longitudinal extension of the first section, wherein an end-face contact surface of the first section and the second section lies in a plane, and wherein a second axis is inclined at an angle relative to the plane.

The disclosed structure may have one or more advantages. For example, the divided discharge chute, which may comprise or consist of the chute connecting piece and the two-part chute extension, may enable the adaptation of the discharge chute to longer cutting unit widths. The first section may form a longitudinal extension of the chute connecting piece, and the second section may form a longitudinal extension of the first section. The inclination of the second axis may have the effect that when the second section is pivoted, the second section may have a lower position on the side facing away from the first section when in the folded position. This may ensure by a simple means or mechanism that the maximum permissible height of the forage harvester for road traffic is not exceeded when the chute extension is in the folded position.

Another advantageous development may comprise the second section being pivotable about the second axis from the unfolded position to a folded position, wherein the second section may be located alongside the first section when in the folded position. In the folded position, the second section may be arranged or positioned in a horizontal plane next to the first section, resulting in a particularly flat design of the forage harvester. In addition, the inclination of the angle may result in a lower position of the free end of the second section in the second position. The apex of the angle may be located at the top of the discharge chute, wherein an angular field may form between the second axis and the plane extending towards the lower side of the discharge chute and, starting from the plane, extends towards the second section.

In one or some embodiments, the angle may be greater than 1 degree and/or less than 5 degrees. With an angle designed in this way, a maximum height required for road traffic may also be maintained for particularly long chute extensions. At the same time, an angle greater than 1 degree and less than 5 degrees may ensure that the first and second sections of the chute extension may have a parallel-running support surface in the folded position in the area of a storage rack located at the rear of the forage harvester so that both sections may be supported on the storage rack in the support position.

In one or some embodiments, a first mounting plate may be arranged or positioned on the first section and a second mounting plate on the second section. The first mounting plate and the second mounting plate may be connected to a first joint, wherein the first joint may form the second axis for pivoting the second section. The forces acting on the first joint may be introduced into the structure of the chute extension using the mounting plate, which may lie flat against the respective side wall of the sections. In one or some embodiments, an eyelet is arranged or positioned on the first joint. The eyelet may be provided for mounting and removing the chute extension. For example, a chain of a crane may be attached to the eyelet. The position of the first joint for the arrangement of the eyelet may be advantageous for transportation detached from the forage harvester since this may be particularly stable due to the mounting plates lying flat against the side walls and, in particular in the second position, the chute extension may have a slight tendency to tilt around the eyelet.

In one or some embodiments, a method for folding a discharge chute of a forage harvester is disclosed. The discharge chute may comprise a chute connecting piece arranged or positioned on the forage harvester so as to be pivotable about a first axis and a chute extension arranged or positioned on the chute connecting piece. The chute extension may comprise a first section and a second section, with the second section being arranged or positioned on the first section so as to be pivotable about a second axis. The discharge chute may be movable between a storage position and a harvesting position, with a folded position located between the storage position and the harvesting position being provided. In the folded position, the chute extension may be moved from a folded position into an unfolded position and/or from the unfolded position into the folded position.

Similarly, the method may have one or more advantages. For example, in the position provided for the harvesting operation, the height of the discharge chute and the associated alignment of the second axis may lead to an uneven load on the pivoting joint forming the second axis. A folding process of the chute extension from an unfolded position to a folded position and vice versa at a height below the harvesting position may lead to a more even load on the pivoting joint so that it is exposed to lesser mechanical loads or stresses during a folding process in the folded position, and therefore may wear to a lesser extent.

In one or some embodiments, the second axis may extend in a vertical direction in the folded position. In this position, there may be a particularly even distribution of force and torque of the mechanical forces acting on the swivel joint so that this position may be particularly advantageous for a swiveling process of the chute extension.

In one or some embodiments, the forage harvester comprises a storage rack for supporting the discharge chute in the storage position, wherein the discharge chute may be located above the storage rack in the folded position. In one or some embodiments, the chute connecting piece is aligned essentially parallel to the forward travel direction of the forage harvester in the folded position (e.g., at least 95% parallel to the forward travel direction of the forage harvester in the folded position; at least 96% parallel to the forward travel direction of the forage harvester in the folded position; at least 97% parallel to the forward travel direction of the forage harvester in the folded position). By placing the discharge chute on the storage rack, the lifting cylinders and swivel axes around which the discharge chute is pivotably arranged or positioned on the forage harvester may be relieved. Furthermore, the discharge chute may be less likely to vibrate in the storage position compared to the harvesting position, so that a more comfortable driving behavior of the forage harvester results.

In one or some embodiments, an actuator or actuating means (an example of which is a switching element) may be provided. In one or some embodiments, the actuator or actuating means may actuate an automatic function for automatically swiveling the discharge chute. It may therefore be sufficient for an operator of the harvester to actuate the automatic function (such as via a mechanical switch and/or via an icon or button on a touchscreen in the cab of the harvester) to swivel the discharge chute.

To enable automatic movement of the discharge chute from the harvesting position to the storage position, in one or some embodiments, the automatic function comprises any one, any combination, or all of the following movement steps (such as all of the following movement steps in the listed order): (a) moving the discharge chute to a position above a storage rack; (b) lowering the discharge chute into the folded position; (c) swiveling the chute extension from an unfolded position into a folded position (e.g., during the swiveling of the chute extension, a discharge flap located at the free end of the chute extension is moved into a position provided for the storage position of the discharge chute); and (d) lowering the discharge chute into the storage position, wherein the discharge chute is positioned on the storage rack (e.g., the discharge chute may be positioned on the storage rack at an angle to (such as relative to) the direction of forward travel of the harvester).

In one or some embodiments, to enable automatic movement of the discharge chute from the storage position to the harvesting position, the automatic function may comprise any one, any combination, or all of the following movement steps (such as all of the following movement steps in the listed order): (1) raising the discharge chute to the folded position; (2) swiveling the chute extension from the folded position into an unfolded position (e.g., during the swiveling of the chute extension, the discharge flap located at the free end of the chute extension is moved into a position provided for the harvesting position of the discharge chute); and (3) raising the discharge chute to the harvesting position.

In one or some embodiments, the automatic function may be activated simply by touching the actuator or actuating means (e.g., the operator actuating a mechanical switch and/or a digital switch, such as by touching an icon on a touchscreen).

In one or some embodiments, the actuator or actuating means may additionally be provided and configured for manual pivoting of the chute extension about the second axis, wherein the chute extension may be automatically pivoted triggered by manual input of holding the actuator or actuating means (e.g., manual input of holding the actuator or actuating means for at least a predetermined amount of time triggers the automatic action).

In order to control an optimum folded position even when moving the position of the discharge chute on uneven ground, the forage harvester may include an inclination sensor, wherein the folded position may be determined depending on sensor data (generated by the inclination sensor) indicative of an inclination of the harvester.

In one or some embodiments, in order to identify the respective position of the chute extension, the discharge chute may comprise at least a first sensor and a second sensor (e.g., the folded position of the chute extension may be identified using the first sensor, and the unfolded position may be identified using the second sensor). Furthermore, the forage harvester may comprise a control device, wherein the control device may be configured to identify the chute extension mounted on the chute connecting piece with a pivotable second section (e.g., the control device may identify the chute extension using data generated by the first sensor and/or second sensor using a voltage signal and may assign it to a chute extension with a pivotable second section). The automatic identification of the chute extension arranged or positioned on the chute connecting piece with a pivotable second section may be particularly advantageous, since the control device may therefore determine a current position of at least a part of the device (e.g., a current position of the chute extension) and the requisite control needed (e.g., whether it is necessary to control to and/or from the folded position, including controlling movement of the position of the chute extension from a folded position to the unfolded position and vice versa). Insofar as a pivotable chute extension is not arranged or positioned on the chute connecting piece, the chute connecting piece may therefore be transferred directly from the storage position to the harvesting position and vice versa.

Referring to the figures, FIG. 1 shows a schematic side view of a harvester designed as a forage harvester 1. Example forage harvester include US Patent Application Publication No. 2019/0289787 A1, US Patent Application Publication No. 2022/0061216 A1, US Patent Application Publication No. 2022/0071091 A1, US Patent Application Publication No. 2023/0232740 A1, each of which are incorporated by reference herein in their entirety. A machine housing 2 of the forage harvester 1 may contain a motor (not shown) for driving wheels 3 and a harvesting header (not shown) that may be mounted on the front side 1*a* of the forage harvester 1. Harvested material picked up from the ground with the aid of the harvesting header may be shredded in a cutterhead (not shown) arranged or positioned inside the machine housing 2 and discharged into a discharge chute (not shown) rising behind a driver's cab 4. A post-accelerator (not shown), also arranged or positioned on the discharge chute inside the machine housing 2, may throw the chopped harvested material through a discharge chute 6 rotatably mounted on a slewing ring 5 on the top of the machine housing 2. The discharge chute 6 may form a transfer device for transferring harvested material to a transport vehicle.

In one or some embodiments, the discharge chute 6 may comprise a chute connecting piece 7 and a first chute extension 8 arranged or positioned on the chute connecting piece 7. The chute connecting piece 7 may be arranged or positioned with a first longitudinal end so as to be rotatable about a vertical first axis of rotation A1 on the slewing ring 5 of the forage harvester 1. Furthermore, the chute connecting piece 7 may be arranged or positioned to pivot about a third axis A3, which may extend transversely to the first axis of rotation A1 and in a substantially horizontal plane when the forage harvester 1 is in the intended operating state. Via a pivoting movement of the chute connecting piece 7 about the third axis A3, the height of the end of the chute connecting piece 7 facing away from the forage harvester 1 and the height of the first chute extension 8 arranged or positioned on the chute connecting piece 7 may be adjusted. For pivoting about the third axis, the forage harvester may include a piston cylinder unit 40. In one or some embodiments, the piston cylinder unit 40 may arranged or positioned between the chute connecting piece 7 and the slewing ring 5 and may be controlled via a control device 48. In one or some embodiments, the first chute extension 8 comprises a first section 9 and a second section 10. In one or some embodiments, the first section 9, the second section 10 and the chute connecting piece 7 are channel-shaped with a rectangular profile so that the chopped harvested material may be conveyed through them. The first section 9 may be arranged or positioned fixed to the end of the chute connecting piece 7 facing away from the forage harvester 1, for example using a screw connection, and may form a longitudinal extension of the chute connecting piece 7. The second section 10 may be pivotably arranged or positioned at the free longitudinal end of the first section 9 via a first joint 11.

Figure 2:
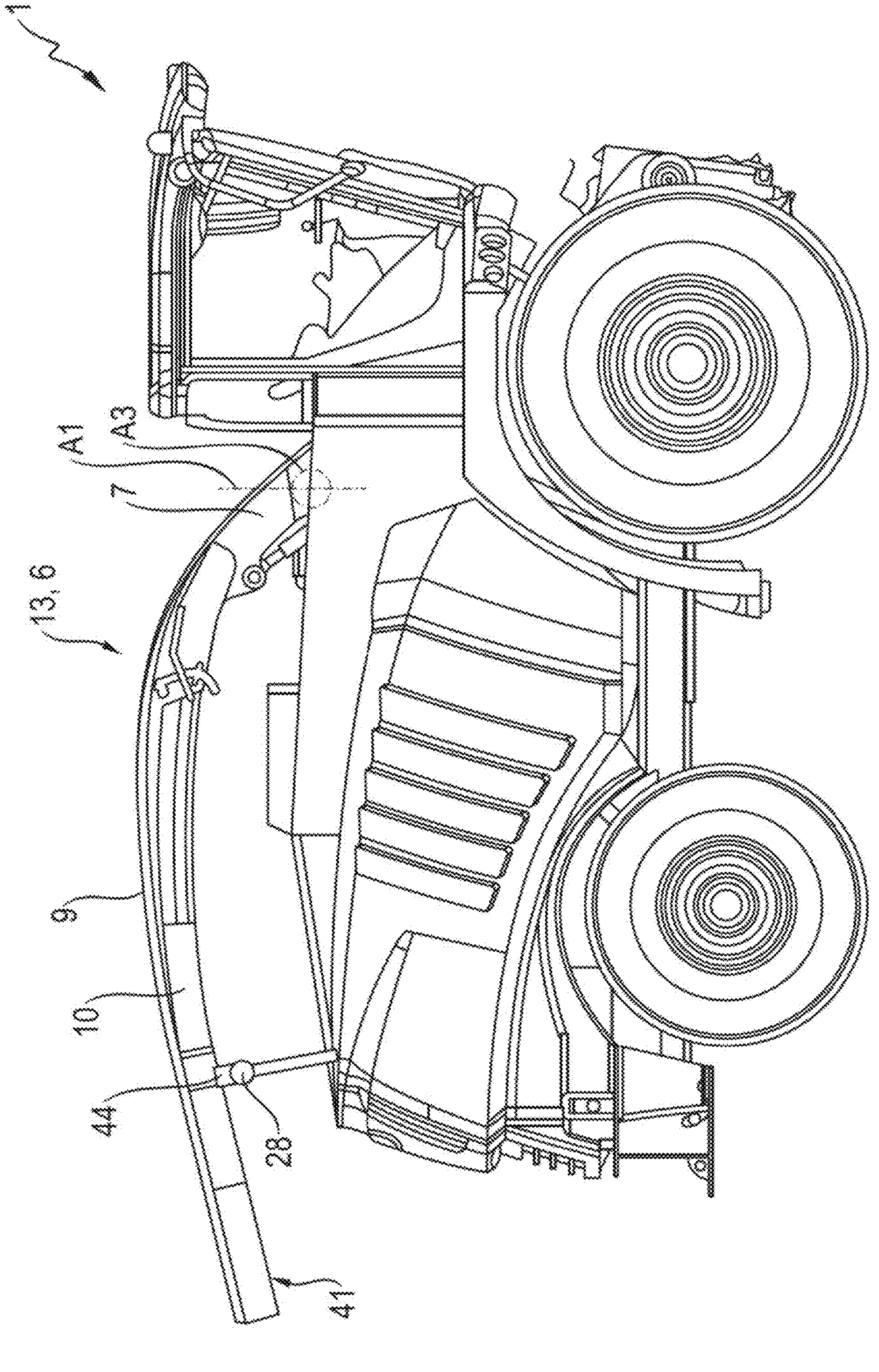
FIG. 2 illustrates a schematic side view of a forage harvester with a discharge chute with a chute extension in a second position.

In one or some embodiments, the first joint 11 provides a second axis A2, to be explained in more detail, so that the first chute extension 8 may be pivoted about the second axis A2 between an unfolded position 12 shown in FIG. 1 in which the second section 10 extends as a longitudinal extension of the first section 9, and a folded position 13 shown in FIG. 2 in which the second section 10 is located alongside the first section 9.

Figure 3:
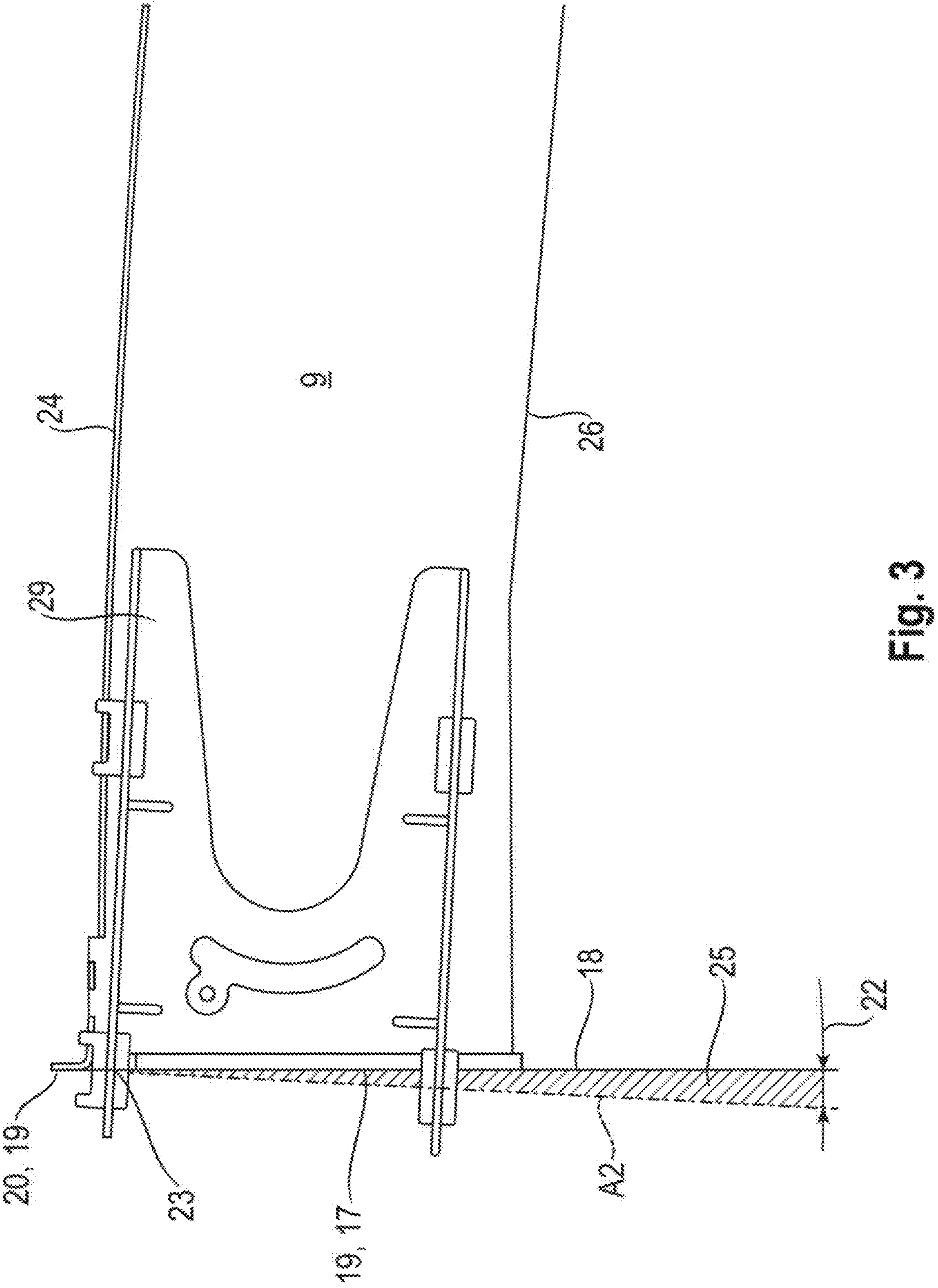
FIG. 3 illustrates a schematic partial view of a first section of the chute extension.

In FIG. 3, the end of the first section 9 facing the second section 10 is shown schematically with the second axis A2 shown as a dashed line. In the unfolded position 12, the end face 17 of the channel-shaped first section 9 has a contact surface 19 lying in a common plane 18 with an end face of the second section 10. For this purpose, the end face 17 of the first section 9 may comprise at least one first flange 20, and the end face of the second section 10 may comprise at least one second flange 21. The first flange 20 and the second flange 21 may touch one another in the first position (see FIG. 1) and may form at least one section of the contact surface 19. The second axis A2 may be inclined at an angle 22 relative to the plane 18. In one or some embodiments, angle 22 is a non-zero angle, as described in more detail below. This inclination may have the effect that, in the folded position 13, the free end or the end of the second section 10 facing away from the first section 9 has a lower position relative to a first chute extension 8 with a second axis A2 located in the plane 18 (e.g., in the folded position 13, the inclination of the angle 22 causes the free end or the end of the second section 10 facing away from the first section 9 to have a lower position relative to a first chute extension 8 with a second axis A2 located in the plane 18 than without the inclination of angle 22 when in the folded position 13). In other words, the free end of the second section 10 in the second position may be brought closer to the machine housing 2 of the forage harvester 1 by the inclination of the second axis A2 relative to the plane 18.

In one or some embodiments, the apex 23 of the angle 22 is located at the top side of the discharge chute 6. In one or some embodiments, the upper side 24 is understood to be the side of the discharge chute 6 facing away from the machine housing 2 of the forage harvester 1. Between the second axis A2 and the plane 18, the resulting angular field 25 extends in the direction of the lower side 26 of the discharge chute 6. The lower side 26 of the discharge chute 6 may be understood here as the side of the discharge chute 6 facing the machine housing 2. Furthermore, the angular field 25 may be aligned orthogonally to the plane 18 and may extend starting from the plane 18 in the direction of the second section 10.

During road travel or when changing from one crop to another, the discharge chute 6 may be moved to a storage position 41 shown schematically in FIG. 2. In the storage position 41, the first chute extension 8 may be in the folded position 13 and may be placed on a storage rack 27 located at the rear of the forage harvester 1. For this purpose, the storage rack 27 may comprise a strut 28 extending transversely to the forward travel direction FR, which may form a support element for the discharge chute 6. At the end faces of the strut 28, lateral support elements 44 may extend upwards in the vertical direction, which may prevent the discharge chute 6 from slipping sideways off the strut 28. In one or some embodiments, the angle 22 is greater than 1 degree and less than 5 degrees. At such an angle 22, a maximum height required for road traffic may also be maintained for particularly long first chute extensions 8, wherein both the first section 9 and the second section 10 may be placed on the storage rack 27 in the storage position.

Furthermore, instead of the first chute extension 8, a second chute extension, not shown here in detail, may be mounted on the chute connecting piece. In its unfolded position 12, the first chute extension 8 may have a greater longitudinal extension than the second chute extension. Furthermore, the second chute extension may differ from the first chute extension 8 by the angle 22 of the second axis A2 relative to the plane 18. The inclination of the angle 22 may be dependent on the longitudinal extension of the chute extension. In particular, the angle of the second chute extension may be smaller than the angle 22 of the second chute extension. In addition, the first chute extension 8 and the second chute extension may differ only in the radius of the arc extending in the longitudinal direction of the respective discharge chute.

Figure 4:
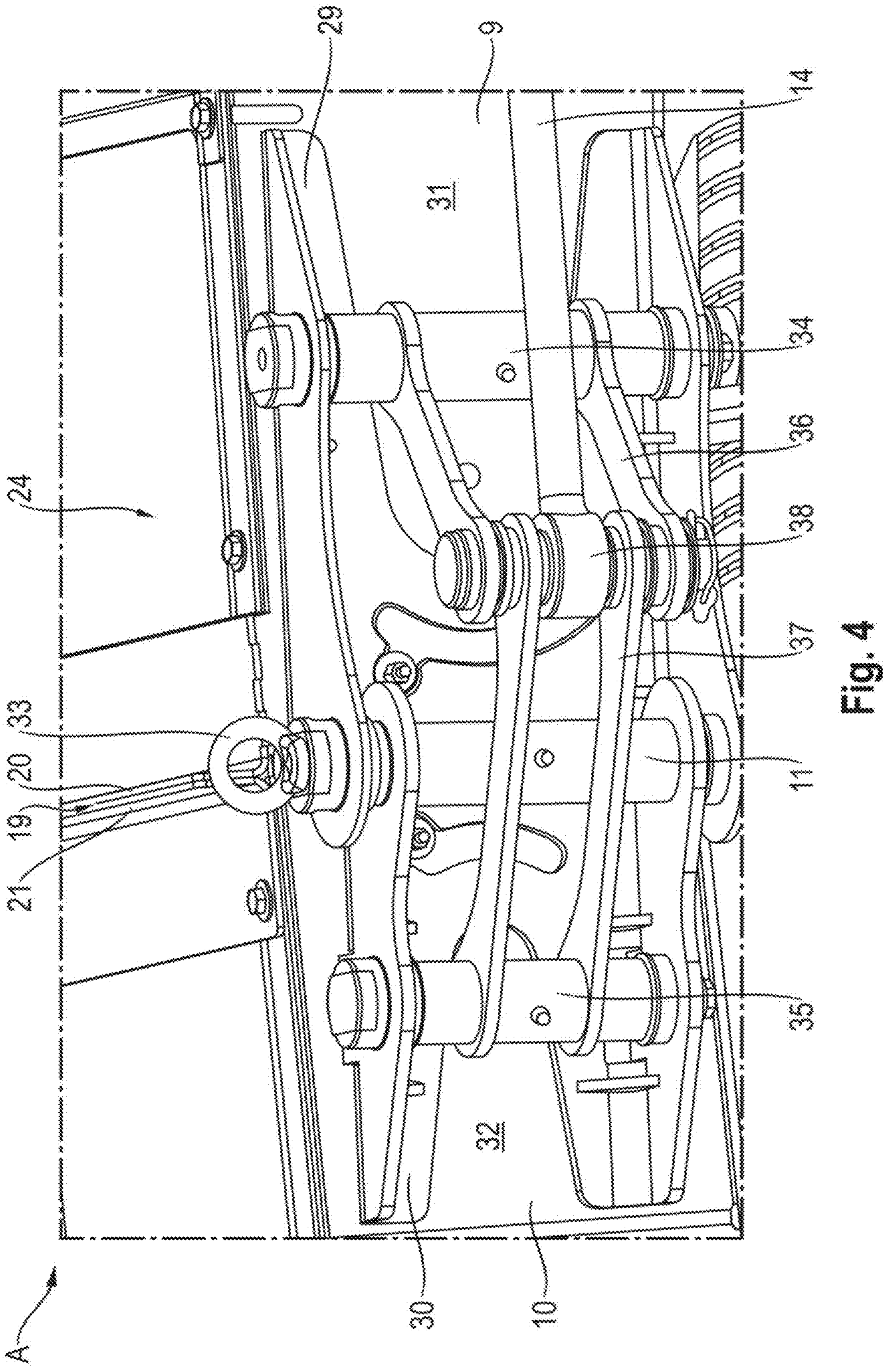
FIG. 4 illustrates a perspective view of a first joint for pivoting a second section relative to a first section of the chute extension.

FIG. 4 shows the section A shown in FIG. 1 in detail. As FIG. 4 shows, the first chute extension 8 comprises a first mounting plate 29 and a second mounting plate 30 to form the second axis A2. The first mounting plate 29 may be arranged or positioned on a side wall 31 of the first section 9 extending between the upper side 24 and the lower side 26 of the discharge chute 6. The second mounting plate 30 may be arranged or positioned on a side wall 32 of the second section 10 extending between the upper side 24 and the lower side 26 of the discharge chute 6. The first mounting plate 29 and the second mounting plate 30 may be connected to the first joint 11, which may form the second axis A2. The first mounting plate 29 and the second mounting plate 30 may be arranged or positioned on the respective side wall 31, 32 so that the inclined angle 22 of the second axis A2 to the plane 18 is set.

In one or some embodiments, an eyelet 33 may be arranged or positioned on the first joint 11 on the side facing the upper side 24 of the discharge chute 6. The eyelet 33 may be provided and arranged or positioned for mounting and removing the first chute extension 8. For example, a chain of a crane may be attached to the eyelet 33. For transportation detached from the forage harvester 1, the position of the first joint 11 for arranging the eyelet 33 may be particularly advantageous since this may be particularly stable and, in particular in the folded position 13, the chute extension 8 may have a slight tendency to tilt about an eyelet 33 placed in this way.

Furthermore, the first mounting plate 29 may comprise a second joint 34, and the second mounting plate 30 may comprise a third joint 35. A first lever 36 may be arranged or positioned on the second joint 34, and a second lever 37 may be arranged or positioned on the third joint 35, wherein the first lever 36 and the second lever 37 may be connected to a fourth joint 38, wherein an actuator 14, which may be designed as a piston cylinder unit, may be arranged or positioned on the fourth joint 38 for pivoting the second section 10 about the second axis A2. The first, second, third and fourth joints 11, 34, 35, 38 may form a four-bar linkage, which may provide a collision-free and durable pivoting mechanism for pivoting the second section 10.

Figure 6:
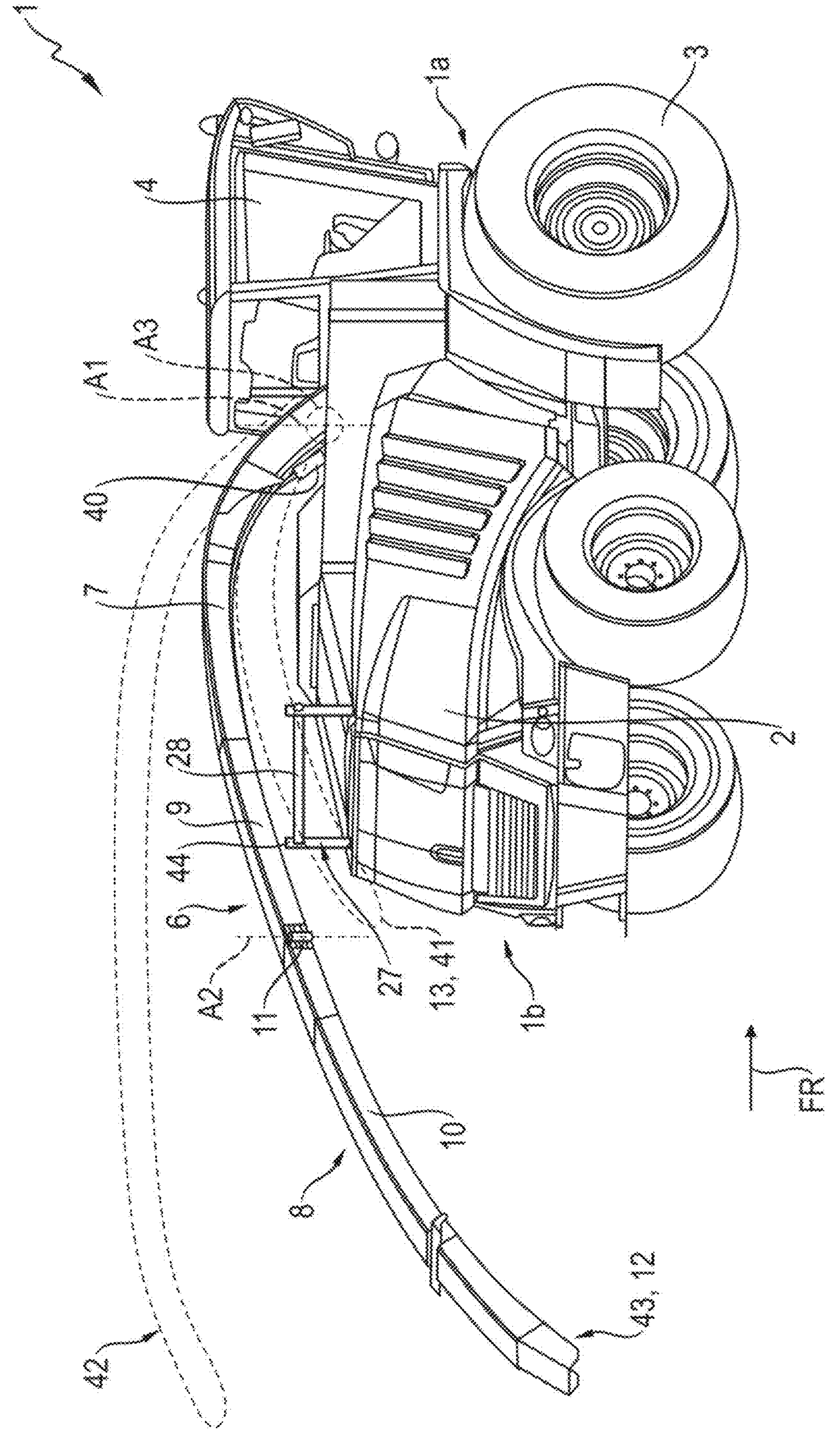
FIG. 6 illustrates a schematic side view of a forage harvester with different positions of the discharge chute.

During a harvesting process, the discharge chute 6 may be located in a harvesting position 42 shown as a dashed line in FIG. 6. In the harvesting position 42, the chute connecting piece 7 may be pivoted about the third axis A3 to its maximum adjustable height, and the chute extension 8 may be located in the unfolded position 12, wherein this may extend as a longitudinal extension of the chute connecting piece 7. In one or some embodiments, the harvesting position 42 may be independent of the set angle of rotation of the chute connecting piece 7 about the axis of rotation A1.

For a harvesting process, the discharge chute 6 may be moved from the storage position 41 to the harvesting position 42 in a manner to be explained in more detail. For this purpose, the forage harvester 1 may comprise a control device 48, shown schematically in FIG. 7. Control device 48 may include at least one processor 57 and at least one memory 58. In one or some embodiments, the processor 57 may comprise a microprocessor, controller, PLA, or the like. Similarly, the memory 58 may comprise any type of storage device (e.g., any type of memory). Though the processor 57 and the memory 58 are depicted as separate elements, they may be part of a single machine, which includes a microprocessor (or other type of controller) and a memory. Alternatively, the processor 57 may rely on the memory 58 for all of its memory needs.

The processor 57 and the memory 58 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The control device 48 may be configured to control the chute extension 8 in one or more positions. As one example, the control device 48 may be configured to control the chute extension 8 to move to a folded position 43 shown in FIG. 6. Alternatively, or in addition, the control device 48 may be configured to control the chute extension 8 to move to an unfolded position 12. In this regard, the control device 48 may be configured to generate one or more commands in order to move the chute extension 8 from the folded position 13 to the unfolded position 12 and/or for moving the chute extension 8 from the unfolded position 12 to the folded position 13. In one or some embodiments, in the folded position 43, the height of the chute connecting piece 7 is between the storage position 41 and the harvesting position 42. In other words, the chute connecting piece 7 may be located at a height between the harvesting position 42 and the storage position 41. This may be based on the realization that particularly large forces and torques may act on the first joint 11 forming the second axis A2 in the harvesting position 42 when the chute extension 8 is pivoted, therefore causing increased signs of wear. A significantly more even load may be exerted when the chute extension 8 is pivoted in the previously described folded position 43. Consequently, the durability of the first joint 11 may be increased by moving to the folded position 43.

In one or some embodiments, the second axis A2 extends in a vertical direction in the folded position 43. In this position, there may be a particularly even distribution of torque and force at the first joint 11.

Furthermore, in the folded position 43, the discharge chute 6 may be located above the storage rack 27, so that it may be placed on the storage rack 27 after moving into the folded position 13 simply by pivoting about the third axis of rotation A3. Unfolding or folding the chute extension 8 in this position may prevent collisions with objects located to the side next to the forage harvester 1. In the folded position 43, the discharge chute 6 may protrude beyond the rear side 1*b* of the forage harvester 1, at least in the unfolded position 12 of the chute extension 8. In the folded position 43, the chute connecting piece 7 may be aligned essentially parallel to the forward travel direction FR of the forage harvester 1.

Figure 7:
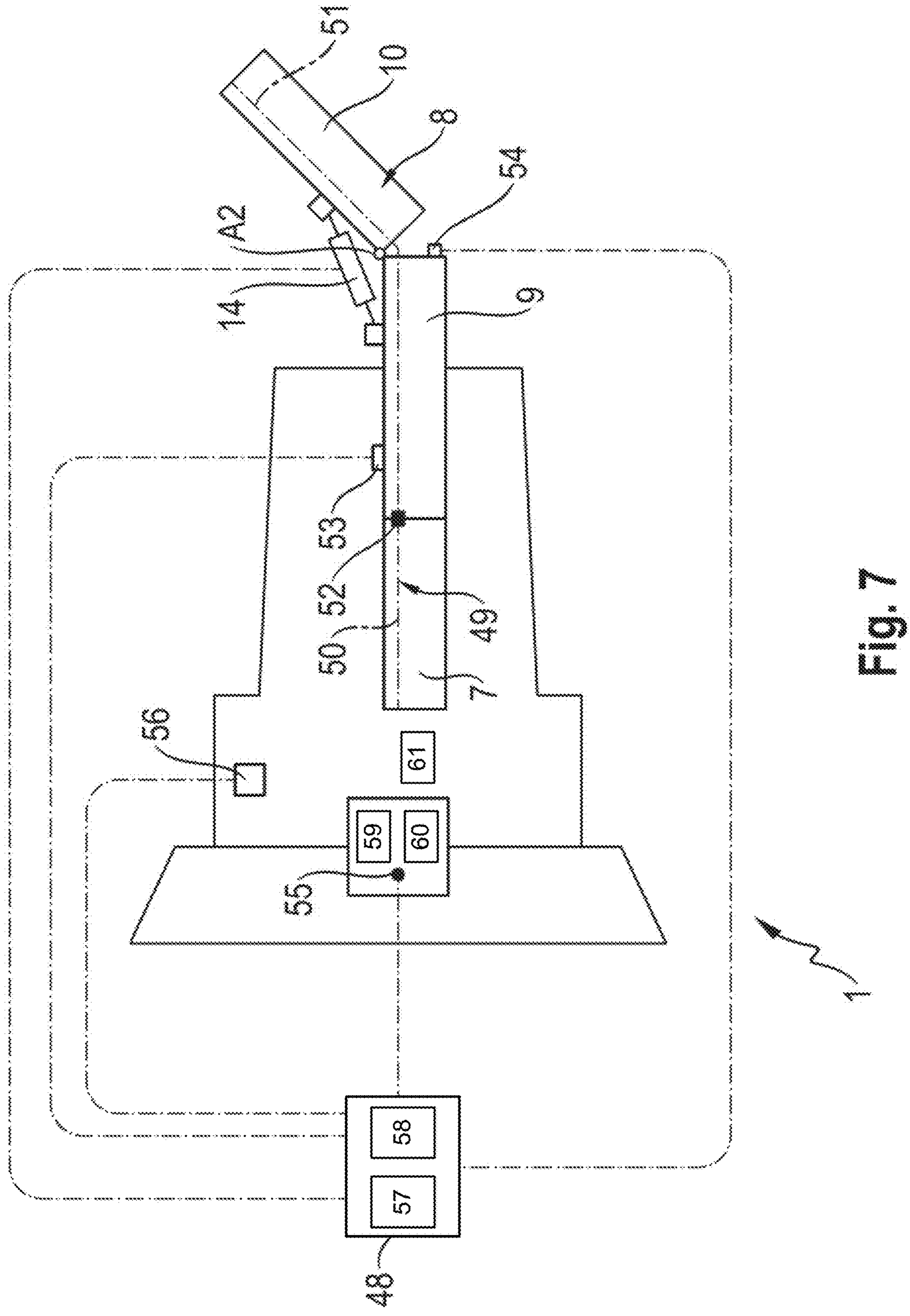
FIG. 7 illustrates a schematic top view of a forage harvester with a discharge chute in a folded position.

Furthermore, the discharge chute 6 may comprise a cable arrangement 49 shown schematically in FIG. 7. The cable arrangement 49 may be configured to connect the electrical components 61 of the chute extension 8, which are known per se and not explained further here, to the internal power supply system and/or the control device 48 of the forage harvester 1. The cable arrangement 49 may comprise a first cable set 50, which may be arranged or positioned on the chute connecting piece 7 and may extend in the axial direction along the chute connecting piece 7. Furthermore, the cable arrangement 49 comprises a second cable set 51, which may be arranged or positioned on the chute extension 8 and may extend in the axial direction along the chute extension 8. The first cable set 50 and the second cable set 51 may be coupled by a plug connection 52 (not shown in detail).

Furthermore, the discharge chute 6 may comprise one or more sensors, such as at least a first sensor 53 and a second sensor 54 configured to generate respective sensor data for identifying the position of the chute extension 8, wherein the folded position 13 of the chute extension 8 may be identified using the first sensor 53, and the unfolded position 12 may be identified using the second sensor 54 (e.g., the control device 48 may be configured to receive respective sensor data from the first sensor 53 in order to analyze the respective sensor data to identify whether the chute extension 8 is in the folded position; the control device 48 may be configured to receive respective sensor data from the second sensor 54 in order to analyze the respective sensor data to identify whether the chute extension 8 is in the unfolded position).

An actuator, such as actuating means 55, which may be designed as a switching element and/or a touchscreen display 59 (through which the operator may touch the screen to activate an icon), may be positioned within or provided in the driver's cab 4 of the forage harvester 1. In one or some embodiments, the actuating means 55 may be designed as a conventional switching element, such as a physically actuatable mechanical switch 60 or button. Alternatively, or in addition, the actuating means may comprise a digital switching element. For example, a touchscreen display 59 may be positioned within or provided in the driver's cab 4 of the forage harvester 1. The touchscreen display 59 may output a digital switching element, such as an icon indicative of a button. In practice, the operator may touch the touchscreen display 59 where the icon is displayed, thereby indicating to the control device 48 that the operator has provided the command to actuate the actuating means. In one or some embodiments, the actuating means 55 may be connected to the control device 48 in a signal-transmitting manner. The control device 48 may be configured to actuate the actuator 14 (e.g., via sending one or more commands to actuate the actuator 14 responsive to input via the actuating means 55). In this regard, using the control device 48, an automatic function for automatically pivoting the discharge chute 6 may be actuated using the actuating means 55. In one or some embodiments, the automatic function may be activated by a single touch of the actuating means 55 (e.g., a single press of the mechanical switch 60; a single tap on the icon of the touchscreen display 59). The automatic function, using the control device 48, may be configured to move the discharge chute 6 from the folded position 13 to the unfolded position 12, or from the unfolded position 12 to the folded position 13.

In one or some embodiments, if the discharge chute 6 is in the harvesting position 42, the discharge chute 6 may be moved to the storage position 41 when the automatic function is activated. For this purpose, the following process steps may be performed as part of the automatic function sequence:

(a) insofar as the discharge chute 6 is rotated about the vertical axis of rotation or first axis A1 formed by the slewing ring such that the discharge chute 6 does not extend beyond the forage harvester 1 at the rear, the discharge chute 6 may be rotated about the first axis of rotation A1 into a position located above a storage rack 27 (e.g., the control device may automatically send one or more commands so that the discharge chute 6 is rotated about the first axis of rotation A1 into a position located above a storage rack 27);

(b) in the next step, the discharge chute 6 is lowered from the height provided for the harvesting position 42 to the folded position 43 described in more detail above (e.g., the control device may automatically send one or more commands so that the discharge chute 6 is lowered from the height provided for the harvesting position 42 to the folded position 43);

(c) in the third step, as shown in FIG. 7, the chute extension 8 is pivoted from the unfolded position 12 into the folded position 13, wherein during the pivoting of the chute extension 8, a discharge flap located at the free end of the chute extension 8, known per se and not shown here, moves into a position provided for the storage position 41 of the chute extension 8 (e.g., the control device may automatically send one or more commands so that the chute extension 8 is pivoted from the unfolded position 12 into the folded position 13). In the position of the discharge flap provided for the storage position 41, a collision with any components of the forage harvester 1 may be avoided. The discharge flap may be moved during the pivoting of the chute extension 8 in order to achieve a time-optimized sequence; and (d) in the last step, the discharge chute 6 is lowered from the folded position 43 into the storage position 41, wherein the discharge chute 6 is positioned on the storage rack 27 (e.g., the control device may automatically send one or more commands so that the discharge chute 6 is lowered from the folded position 43 into the storage position 41, with the discharge chute 6 being positioned on the storage rack 27). As shown in FIG. 2, in order to position the discharge chute 6 on the storage rack 27, it may be provided that, depending on the dimensions of the chute extension 8, such as the width of the chute extension 8, the discharge chute 6 may be positioned on the storage rack 27 at an angle to the forward travel direction FR.

If the discharge chute 6 is in the storage position 41, the discharge chute 6 may be moved to the harvesting position 42 when the automatic function is activated. For this purpose, the following process steps may be performed, using the control device 48, as part of the automatic function sequence: (1) the discharge chute 6 is lifted of the storage rack 27 to the folded position 43 (e.g., the control device may automatically send one or more commands so that the discharge chute 6 is lifted of the storage rack 27 to the folded position 43); (2) in the next step, the chute extension 8 is moved from the folded position 13 to the unfolded position 12, wherein during the pivoting of the chute extension 8, the discharge flap located at the free end of the chute extension 8 is moved into a position provided for the harvesting position 42 of the discharge chute 6 (e.g., the control device may automatically send one or more commands so that the chute extension 8 is moved from the folded position 13 to the unfolded position 12); (3) in the final step, the discharge chute 6 is raised from the folded position 43 to the harvesting position 42 (e.g., the control device may automatically send one or more commands so that the discharge chute 6 is raised from the folded position 43 to the harvesting position 42).

In one or some embodiments, the actuating means 55 may additionally be provided and arranged or positioned for manually pivoting the chute extension 8 about the second axis A2, wherein while the actuating means 55 is held, the control device 48 may actuate the actuator 14 to pivot the chute extension 8. Here, when the chute extension 8 is in the unfolded position 12, the actuator 14 may be actuated via the control device 48 to pivot the chute extension 8 towards the folded position 13 (e.g., responsive to the control device 48 receiving an indication by the operator to pivot the chute extension 8 towards the folded position 13, the control device 48 sends command(s) to control one or more actuators, motors, or the like (such as actuator 14) in order to mechanically pivot the chute extension 8 towards the folded position 13). Furthermore, when the chute extension 8 is in the folded position 13, the actuator 14 may be actuated via the control device 48 to pivot the chute extension 8 towards the unfolded position (e.g., responsive to the control device 48 receiving an indication by the operator to pivot the chute extension 8 towards the unfolded position, the control device 48 sends command(s) to control one or more actuators, motors, or the like (such as actuator 14) in order to mechanically pivot the chute extension 8 towards the unfolded position). Various ways to actuate the actuating means are contemplated. In one or some embodiments, an actuation of the actuating means 55 for a duration of at least 2 seconds may be regarded as holding the actuating means 55 (e.g., the operator holding the mechanical switch 60 for at least 2 seconds; the operator touching the icon on the touchscreen display 59 for at least 2 seconds). Furthermore, in one or some embodiments, an actuation of the actuating means 55 with a duration of at most 2 seconds may be regarded as touching.

So that a folded position 43 in which the second axis A2 is vertically aligned may also be approached when the forage harvester 1 is in an inclined position, the forage harvester 1 may comprise an inclination sensor 56 for determining an inclination of the forage harvester 1 (e.g., the inclination sensor 56 may generate sensor data indicative of inclination; the control device 48 may receive and analyze the sensor data (such as compare the sensor data with predetermined inclined sensor data) in order to determine whether the forage harvester is in the inclined position). In this regard, the inclination sensor 56 may be connected to the control device 48 in a signal-transmitting manner (e.g., to transmit the sensor data wired and/or wirelessly to the control device 48). Thus, the control device 48 may be configured in such a way that the control device 48 determines the folded position 43 on the basis of the inclined position, and may provide for movement (such as automatic movement) of the chute extension 8 in which the second axis may be aligned vertically even when the forage harvester 1 is inclined.

In one or some embodiments, the vertical direction may comprise the direction in which the earth's gravitational force acts.

Furthermore, the control device 48 may be configured to identify the chute extension 8 with the pivotable second section 10 mounted on the chute connecting piece 7. For example, the control device 48 may be configured to perform the identification using data (such as a voltage signal) from the first sensor 53 and/or the second sensor 54 and to assign it to the chute extension 8 with a pivotable second section 10. In one or some embodiments, the chute extension 8 with a pivotable second section 10 has the first sensor 53 and the second sensor 54 (described in more detail above), which is in contrast to a chute extension that does not comprise a pivotable second section 10. In practice, the first sensor 53 and/or the second sensor 54 may be supplied with voltage by a generally known central electrical system of the forage harvester 1, which is not explained in more detail here. The first sensor 53 and the second sensor 54 may communicate with the control device 48 in a signal-transmitting manner via the cable arrangement 49 (e.g., wired) and/or wirelessly. The sensor signals (indicative of sensor data) generated by the first sensor 53 and the second sensor 54 may be evaluated by the control device 48 (e.g., processor 57 is configured to analyze, such as compare, the sensor data with predetermined data stored in memory 58 in order to determine the configuration of the chute extension 8). When there is a chute extension without a pivoting second section 10, there may be no first sensor 53 or second sensor 54. In this case, the voltage signal from the central electrical system may be transmitted (e.g., wired and/or wirelessly) directly to the control device 48 via the plug connection 52. This voltage signal may differ from the voltage signal of the first sensor 53 and the second sensor 54 so that the control device 48 recognizes the pivoting second section 10 on the basis of the voltage signal. When a pivoting second section 10 is identified, the control device 48 is configured to provide the operator of the forage harvester 1 with the corresponding functions for folding or unfolding the chute extension 8 (e.g., responsive to the control device 48 identifying the pivoting second section 10, the control device 48 may be configured to output on the touchscreen display 59 the corresponding functions (such as representative by respective icons on the touchscreen display 69) for folding or unfolding the chute extension 8).

Figure 5:
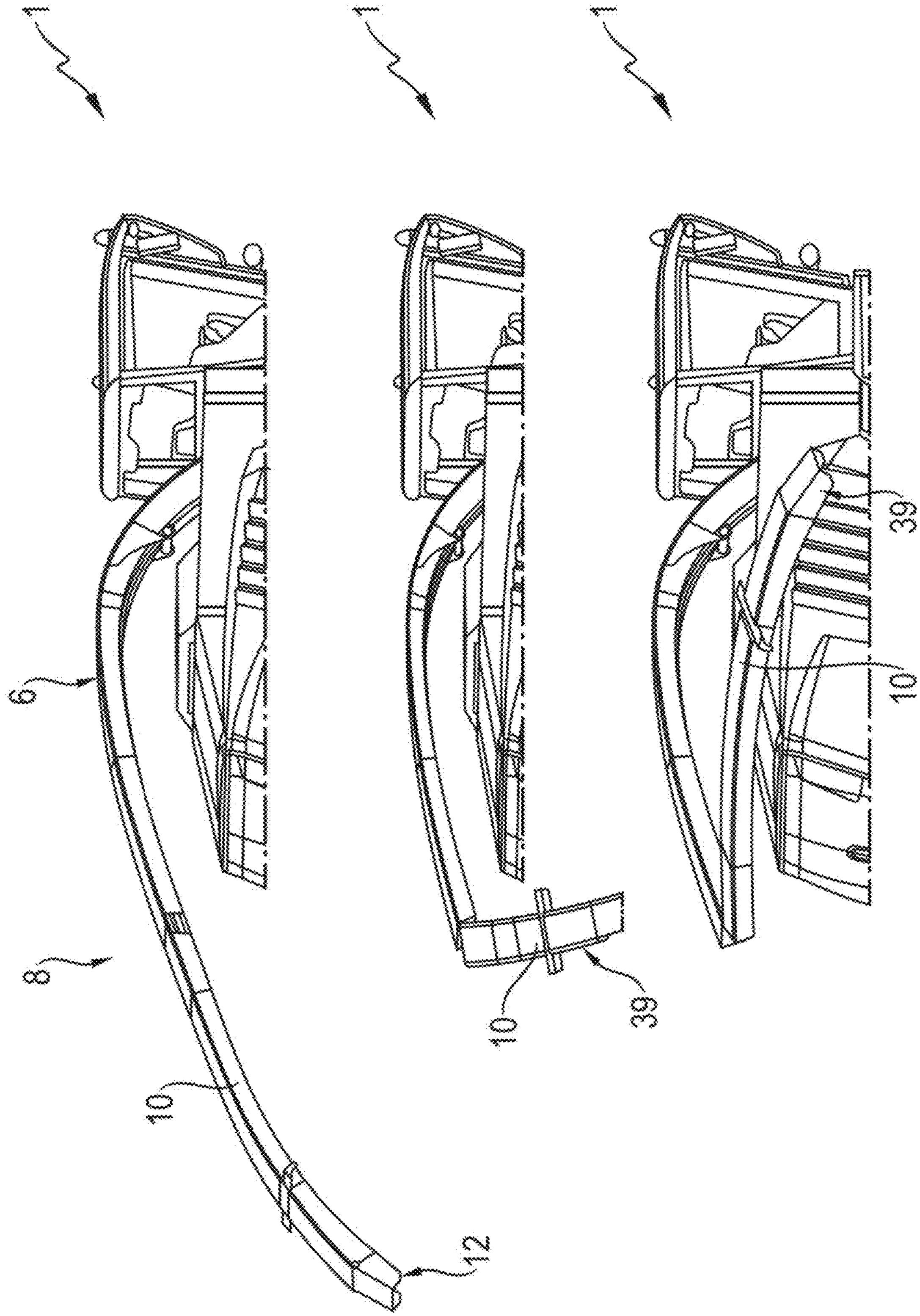
FIG. 5 illustrates a schematic view of a forage harvester, wherein the chute extension is depicted in various positions.

FIG. 5 illustrates the forage harvester 1 with the chute extension 8. The pivoting movement of the second section 10 from the folded position 13 to the unfolded position 12 is shown by different intermediate positions 39 of the second section 10. The second axis A2 may be inclined relative to a plane in which the first section 9 and the second section 10 have a contact surface on the end face in the unfolded position 12, wherein the contact surface lies in the plane. This may cause the second section 10 to be brought closer to the machine housing 2 in the folded position 13 shown in FIG. 2 and, in particular, is in a lower position than the first section 9.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

| | |
|---|---|
| 1 | Forage harvester |
| 1a | Front side |
| 1b | Rear side |
| 2 | Machine housing |
| 3 | Wheels |
| 4 | Driver's cab |
| 5 | Slewing ring |
| 6 | Discharge chute |
| 7 | Chute connecting piece |
| 8 | Chute extension |
| 9 | First section |
| 10 | Second section |
| 11 | First joint |
| 12 | Unfolded position |
| 13 | Folded position |
| 14 | Actuator |
| 15 | Storage rack |
| 16 | Strut |
| 17 | End face |
| 18 | Plane |
| 19 | Contact surface |
| 20 | Flange |
| 21 | Flange |
| 22 | Angle |
| 23 | Apex |
| 24 | Top side |
| 25 | Angular field |
| 26 | Bottom side |
| 27 | Storage rack |
| 28 | Strut |
| 29 | First mounting plate |
| 30 | Second mounting plate |
| 31 | Side wall |
| 32 | Side wall |
| 33 | Eyelet |
| 34 | Second joint |
| 35 | Third joint |
| 36 | First lever |
| 37 | Second lever |
| 38 | Fourth joint |
| 39 | Intermediate position |
| 40 | Piston cylinder unit |
| 41 | Storage position |
| 42 | Harvesting position |
| 43 | Folded position |
| 44 | Support elements |
| 45 | Harvesting position |
| 46 | Actuating means |
| 47 | Inclination sensor |
| 48 | Control device |
| 49 | Cable arrangement |
| 50 | First cable set |
| 51 | Second cable set |
| 52 | Plug connection |
| 53 | First sensor |
| 54 | Second sensor |
| 55 | Actuating means |
| 56 | Inclination sensor |
| 57 | Processor |
| 58 | Memory |
| 59 | Touchscreen |
| 60 | Switch |
| 61 | Electrical components |
| A | Section |
| A1 | First axis |
| A2 | Second axis |
| A3 | Third axis |
| FR | Driving direction |

The invention claimed is:

1. A forage harvester comprising:

a discharge chute including:

a chute connecting piece positioned on the forage harvester so that the discharge chute is configured to pivot about a first axis; and at least one extension positioned on the chute connecting piece, wherein the at least one extension comprises a first section and a second section arranged on the first section so as to be pivotable about a second axis;

wherein, in an unfolded position, the second section is configured to form a longitudinal extension of the first section;

wherein a contact surface of the first section and the second section lies in a plane; and wherein the second axis is inclined at an angle relative to the plane, the angle being a non-zero angle.

2. The forage harvester of claim 1, wherein the second section is configured to pivot about the second axis from the unfolded position to a folded position; and wherein the second section is positioned alongside the first section when in the folded position.

3. The forage harvester of claim 2, wherein an inclination of the angle results in a lower position of a free end of the second section in the folded position.

4. The forage harvester of claim 2, wherein an apex of the angle is located at a top side of the discharge chute; and wherein an angular field is formed between the second axis and the plane and extends towards a lower side of the discharge chute and, starting from the plane, extends towards the second section.

5. The forage harvester of claim 4, wherein the angle is greater than 1 degree and less than 5 degrees.

6. The forage harvester of claim 1, wherein a first mounting plate is positioned on the first section;

wherein a second mounting plate is positioned on the second section;

wherein the first mounting plate and the second mounting plate are connected to a first joint; and wherein the first joint forms the second axis for pivoting the second section.

7. The forage harvester of claim 6, wherein an eyelet is positioned on the first joint.

8. The forage harvester of claim 1, wherein the discharge chute has a rectangular profile;

wherein the first section and the second section each have a respective flange on their end face;

wherein the respective flanges form the contact surface of the first section and the second section lying in the plane when in the unfolded position.

9. A method operating a discharge chute of a forage harvester, the method comprising:

operating with the forage harvester that comprises:

a discharge chute including:

a chute connecting piece positioned on the forage harvester so that the discharge chute is configured to pivot about a first axis; and at least one extension positioned on the chute connecting piece, wherein the at least one extension comprises a first section and a second section arranged on the first section so as to be pivotable about a second axis;

wherein, in an unfolded position, the second section is configured to form a longitudinal extension of the first section;

wherein a contact surface of the first section and the second section lies in a plane;

wherein the second axis is inclined at an angle relative to the plane, the angle being a non-zero angle;

wherein the discharge chute is configured to move between a storage position and a harvesting position; and wherein, for the discharge chute, a folded position is provided between the storage position and the harvesting position;

using the forage harvester by:

with the discharge chute moved in the folded position, moving the discharge chute at least one extension from a folded position into an unfolded position or from the unfolded position into the folded position.

10. The method of claim 9, wherein the second axis extends in a vertical direction when the discharge chute is in the folded position.

11. The method of claim 9, wherein the forage harvester comprises a storage rack for supporting the discharge chute in the storage position;

wherein the discharge chute is located above the storage rack in the folded position; and wherein the chute connecting piece is aligned essentially parallel to a forward travel direction of the forage harvester in the folded position.

12. The method of claim 9, wherein an actuator is used to trigger an automatic function for automatically pivoting the discharge chute.

13. The method of claim 12, wherein the automatic function comprises automatically moving the discharge chute from the harvesting position to the storage position by:

(a) moving the discharge chute to a position above a storage rack;

(b) lowering the discharge chute into the folded position;

(c) pivoting the at least one extension from the unfolded position into the folded position; and (d) lowering the discharge chute into the storage position, wherein the discharge chute is positioned on the storage rack.

14. The method of claim 13, wherein during the pivoting of the at least one extension, a discharge flap located at a free end of the at least one extension is moved into a position provided for the storage position of the discharge chute; and wherein after lowering the discharge chute into the storage position, the discharge chute is positioned on the storage rack at an angle to a direction of forward travel.

15. The method of claim 12, wherein the automatic function comprises automatically moving the discharge chute from the storage position to the harvesting position by:

(1) raising the discharge chute to the folded position;

(2) pivoting the at least one extension from the folded position into the unfolded position; and (3) raising the discharge chute to the harvesting position.

16. The method of claim 15, wherein during the pivoting of the at least one extension, a discharge flap located at a free end of the at least one extension is moved into a position provided for the harvesting position of the discharge chute.

17. The method of claim 12, wherein the automatic function is actuated by touching the actuator.

18. The method of claim 12, wherein the actuator further triggers, via manual input of holding the actuator, pivoting the at least one extension about the second axis.

19. The method of claim 9, wherein the forage harvester comprises an inclination sensor that generates data indicative of an inclination of the forage harvester; and wherein the folded position of the discharge chute is determined depending on the inclination of the forage harvester.

20. The method of claim 9, wherein the discharge chute comprises at least a first sensor and a second sensor for identifying a position of the at least one extension;

wherein a control device of the forage harvester identifies the folded position of the at least one extension using data generated by the first sensor; and wherein the control device of the forage harvester identifies the unfolded position using data generated by the second sensor.

* * * * *